United States Patent
Urano et al.

(10) Patent No.: US 8,590,137 B2
(45) Date of Patent: Nov. 26, 2013

(54) METHOD OF MANUFACTURING A STATOR

(75) Inventors: Hiroaki Urano, Miyoshi (JP); Eiji Yamada, Owariasahi (JP); Kazutaka Tatematsu, Nagoya (JP); Yasuhiro Endo, Okazaki (JP); Yasuaki Tahara, Nagoya (JP); Akihiro Tanaka, Nishio (JP); Kenji Honda, Seto (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 155 days.

(21) Appl. No.: 13/133,548

(22) PCT Filed: Oct. 6, 2009

(86) PCT No.: PCT/JP2009/067383
§ 371 (c)(1),
(2), (4) Date: Jul. 6, 2011

(87) PCT Pub. No.: WO2010/067657
PCT Pub. Date: Jun. 17, 2010

(65) Prior Publication Data
US 2011/0258840 A1    Oct. 27, 2011

(30) Foreign Application Priority Data
Dec. 9, 2008    (JP) ................................. 2008-313447

(51) Int. Cl.
*H02K 1/14*    (2006.01)
*H02K 15/02*    (2006.01)
(52) U.S. Cl.
USPC ..................... 29/596; 310/216.008

(58) Field of Classification Search
CPC ........ H02K 1/148; H02K 1/04; H02K 15/022
USPC ....................... 29/596; 310/216.008, 216.009
See application file for complete search history.

(56) References Cited

U.S. PATENT DOCUMENTS

| 3,175,277 | A | * | 3/1965 | Brown et al. ................... 29/596 |
| 5,526,560 | A | * | 6/1996 | Tsuruya ......................... 29/596 |
| 7,667,367 | B2 | * | 2/2010 | Matsuo et al. ......... 310/216.004 |

FOREIGN PATENT DOCUMENTS

| JP | 7-46784 A | 2/1995 |
| JP | 8-340660 A | 12/1996 |

(Continued)

OTHER PUBLICATIONS

International Search Report mailed Jan. 12, 2010 of PCT/JP2009/067383.

(Continued)

*Primary Examiner* — Livius R Cazan
(74) *Attorney, Agent, or Firm* — Kenyon & Kenyon LLP

(57) ABSTRACT

A stator provided with annular split stator cores, formed by stacking steel plates. Each plate includes a yoke and a stator tooth. The cores include a yoke portion a stator tooth portion. The stator is manufactured by arranging an electromagnetic steel plate between a first die and a second die. The first die has a hole shaped as a steel plate. The second die has a projection inserted into the hole and shaped as a steel plate. The steel plates are formed by the first and the second dies. In a gap between an inner surface of the first die that defines the hole and an outer surface of the projection, a gap at a part that forms the stator tooth portion is larger than a gap at a part that defines a circumferential end surface of the yoke portion located in a circumferential direction of the stator core.

4 Claims, 9 Drawing Sheets

(56) References Cited

FOREIGN PATENT DOCUMENTS

| | | |
|---|---|---|
| JP | 9-233742 A | 9/1997 |
| JP | 10-126983 A | 5/1998 |
| JP | 11-146608 A | 5/1999 |
| JP | 11-346447 A | 12/1999 |
| JP | 2002-345190 A | 11/2002 |
| JP | 2003-088013 A | 3/2003 |
| JP | 2003-284269 A | 10/2003 |
| JP | 2003-304655 A | 10/2003 |
| JP | 2005-073490 A | 3/2005 |
| JP | 2005-354817 A | 12/2005 |
| JP | 2007-74851 A | 3/2007 |
| JP | 2007-166759 A | 6/2007 |
| JP | 2007-215334 A | 8/2007 |
| JP | 2008-113529 A | 5/2008 |
| JP | 2010-114951 A | 5/2010 |

OTHER PUBLICATIONS

Written Opinion of PCT/JP2009/067383.
International Preliminary Report on Patentability (IPRP) mailed Mar. 16, 2011.

* cited by examiner

METHOD OF MANUFACTURING A STATOR

This is a 371 national phase application of PCT/JP2009/067383 filed 6 Oct. 2009, which claims priority to Japanese Application No. 2008-313447 filed 9 Dec. 2008, the contents of which are incorporated herein by reference.

FIELD OF THE INVENTION

The present invention relates to a method of manufacturing a stator.

BACKGROUND OF THE INVENTION

Conventionally, there have been proposed a variety of stators formed of annularly arranged split stator cores each formed by stacking a plurality of electromagnetic steel plates.

A stator iron core structure of an electric rotating machine disclosed in Japanese Patent Laying-Open No. 2003-304655 includes a plurality of teeth and an approximately cylindrical yoke portion and is formed by stacking steel plates.

A stator iron core of an electric rotating machine disclosed in Japanese Patent Laying-Open No. 2003-88013 is formed of a plurality of segments, which are divided for each salient pole.

Main components of an electric rotating machine disclosed in Japanese Patent Laying-Open No. 2005-73490 include a flux path yoke portion and a plurality of magnetic pole tooth portions mounted in the flux path yoke portion.

PRIOR ART DOCUMENTS

Patent Documents

Patent Document 1: Japanese Patent Laying-Open No. 2003-304655
Patent Document 2: Japanese Patent Laying-Open No. 2003-88013
Patent Document 3: Japanese Patent Laying-Open No. 2005-73490

SUMMARY OF THE INVENTION

Problems to be Solved by the Invention

However, in the conventional stator iron core structure, when electric rotating machines provided with such stator iron core structure are driven, the temperature increases and the insulation performance of the coils deteriorates.

The present invention is made to solve the above-noted problem. An object of the present invention is to provide a method of manufacturing a stator with improved heat dissipation characteristics.

Means for Solving the Problems

In a method of manufacturing a stator according to the present invention, the stator includes a stator core formed by annularly arranging a plurality of split stator cores each formed by stacking unit steel plates each including a unit yoke portion and a unit stator tooth portion formed to protrude from the unit yoke portion. The split stator cores each include a yoke portion formed by stacking the unit yoke portions and a stator tooth formed by stacking the unit stator tooth portions. The method includes the step of: forming the unit steel plate by arranging an electromagnetic steel plate between a first die having a hole portion formed in a shape of the unit steel plate and a second die including a projection portion formed in a shape of the unit steel plate, which can be inserted into the hole portion. In a gap between an inner surface of the first die that defines the hole portion and an outer surface of the projection portion, a gap at a part that forms the unit stator tooth portion is larger than a gap at a part that defines a unit circumferential end surface of the unit yoke portion that is located in a circumferential direction of the stator core.

In a method of manufacturing a stator according to the present invention, the stator includes a stator core formed by annularly arranging a plurality of split stator cores each formed by stacking unit steel plates each including a unit yoke portion and a unit stator tooth portion formed to protrude from the unit yoke portion. The split stator cores each including a yoke portion formed by stacking the unit yoke portions and a stator tooth formed by stacking the unit stator tooth portions. The method includes the step of: forming a cut portion serving as a unit circumferential end surface of the unit yoke portion in an electromagnetic steel plate; and forming the unit steel plate by stamping the electromagnetic steel plate having the cut portion formed therein.

Effects of the Invention

According to the method of manufacturing a stator in accordance with the present invention, a stator with improved heat dissipation characteristics can be achieved.

DETAILED DESCRIPTION

A method of manufacturing a stator in accordance with embodiments of the present invention will be described using FIG. 1 to FIG. 18.

It is noted that when the number, amount, etc. are referred to in the embodiments described below, the present invention is not limited to such number, amount, etc. unless otherwise specified. In the following embodiments, each component is not necessarily essential to the present invention unless otherwise specified. When a plurality of embodiments are provided below, it is initially intended that the features of the embodiments can be combined as appropriate, unless otherwise specified.

First Embodiment

Figure 1:
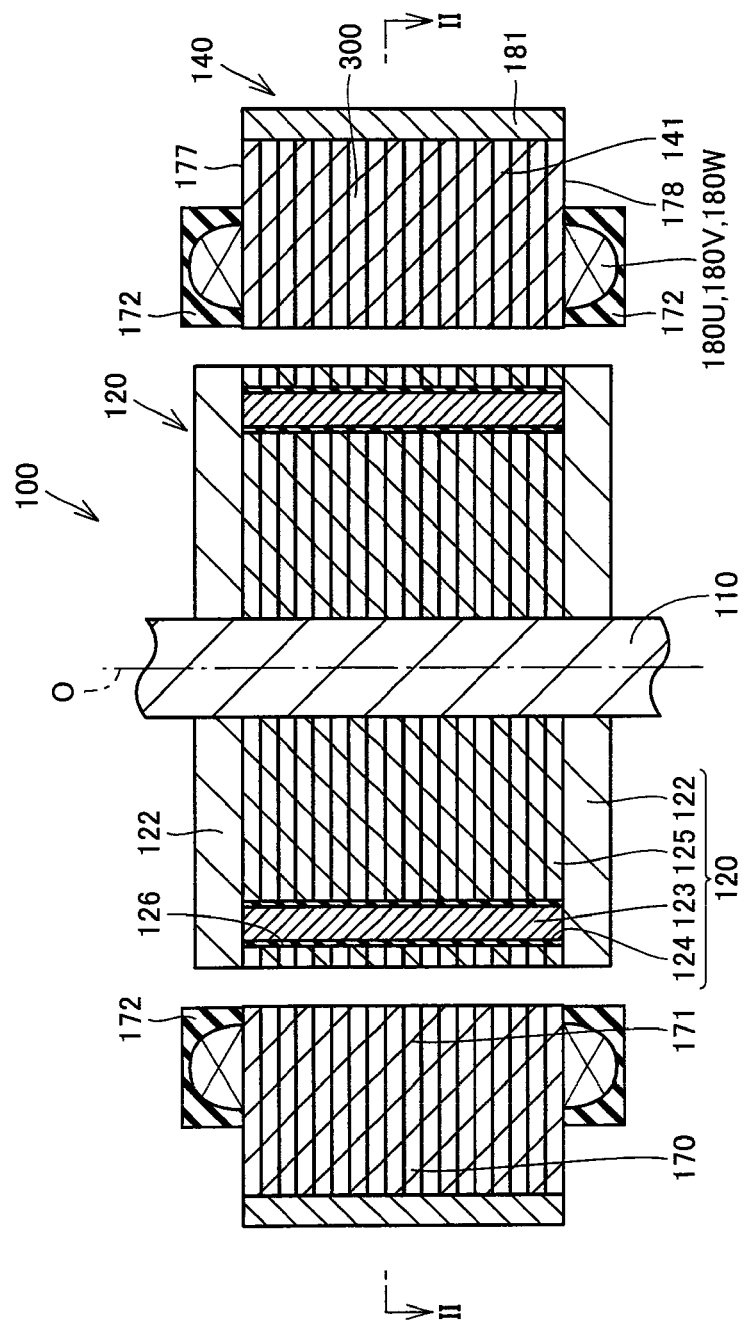
FIG. 1 is a side cross-sectional view schematically showing a structure of an electric rotating machine in accordance with a first embodiment of the present invention.

FIG. 1 is a side cross-sectional view schematically showing a structure of an electric rotating machine in accordance with a first embodiment of the present invention. As shown in FIG. 1, an electric rotating machine 100 includes a rotating shaft 110 rotatably fixed about a rotation center line O, a rotor 120 provided to be rotatable together with rotating shaft 110, and an annular stator 140 provided around rotor 120. Electric rotating machine 100 is typically mounted on a hybrid vehicle and functions as a driving source for driving wheels or a generator for generating electricity using motive power of an engine or the like. It may also be mounted, for example, on an electric vehicle and used as a driving source for driving wheels.

Rotor 120 includes a rotor core 125 formed by stacking a plurality of electromagnetic steel plates, a permanent magnet 123 inserted in a magnet insertion hole 126 formed in rotor core 125, and end plated 122 provided on end surfaces in the axial direction of rotor core 125. Permanent magnet 123 is fixed by resin 124 filled in magnet insertion hole 126.

Stator 140 is formed in an annular shape and includes a stator core 141 annularly formed to surround the circumference of rotor 120, a ring 181 mounted on the outer circumference of stator core 141, and a U-phase coil 180U, a V-phase coil 180V, and a W-phase coil 180W mounted on stator core 141. Insulative mold resin 172 is formed on axial end surfaces 177, 178 of stator 140 (stator core 141). Mold resin 172 is formed, for example, of a thermosetting resin such as BMC (Bulk Molding Compound) or epoxy resin or a thermoplastic resin such as PPS (Polyphenylene Sulfide) or PBT (Polybutylene Terephthalate)

Then, stator 140 includes a yoke body 170 extending annularly and a plurality of stator teeth 171 protruding radially inward from the inner circumferential surface of yoke body 170.

Figure 2:
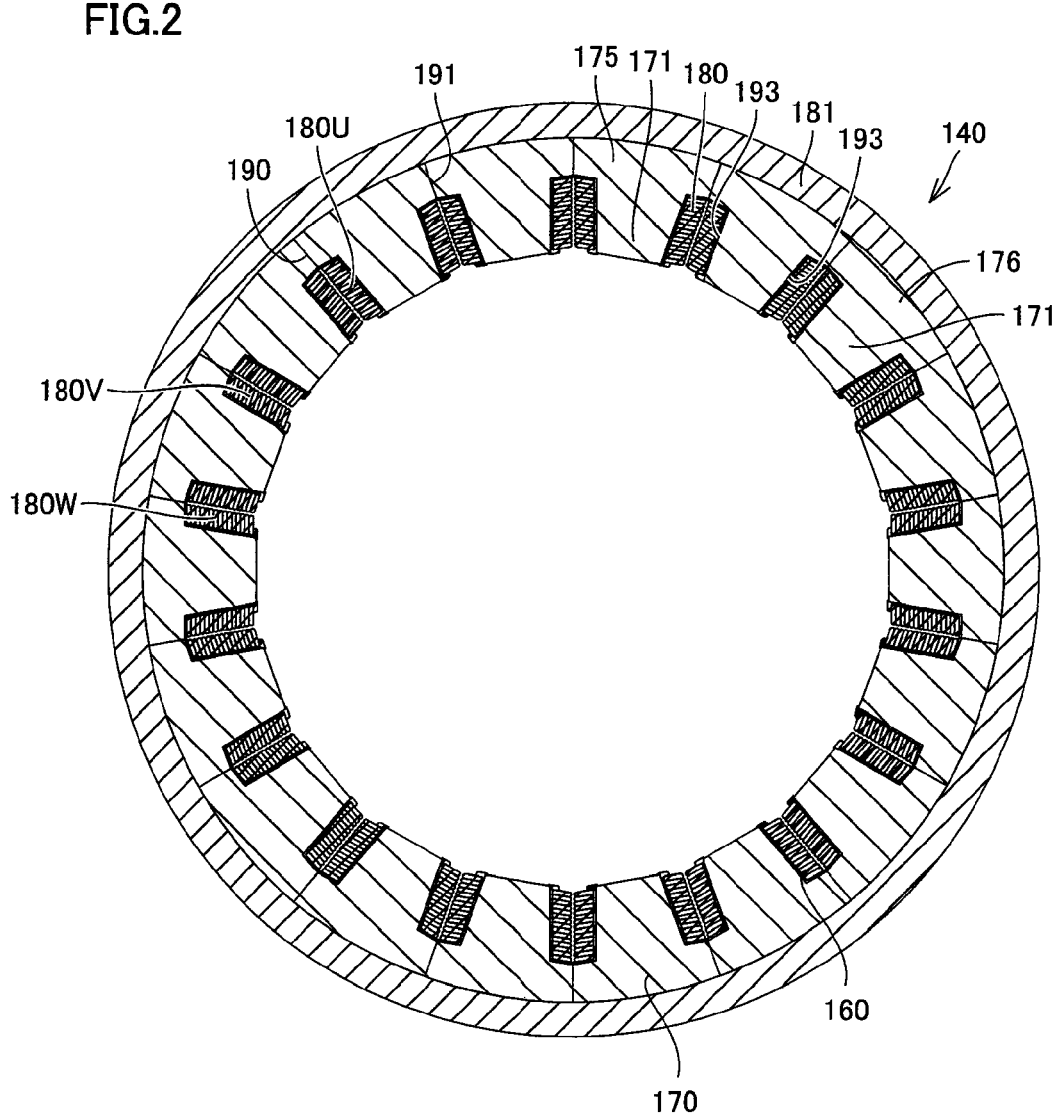
FIG. 2 is a cross-sectional view taken along line II-II in FIG. 1.

FIG. 2 is a cross-sectional view taken along line II-II in FIG. 1. As shown in FIG. 2, stator 140 includes a plurality of split stator cores 175, an insulator 160, which will be described later, mounted on each split stator core 175, and a coil 180 mounted on each split stator core 175 with insulator 160 interposed, and a ring 181 mounted on the outer circumferential side of split stator cores 175 to annularly fix split stator cores 175.

Here, each split stator core 175 includes a yoke portion 176 extending in the circumferential direction of stator 140 and a stator tooth 171 protruding from yoke portion 176 radially inward of stator 140.

Here, among the surfaces of yoke portion 176, circumferential end surfaces 190, 191 arranged in the circumferential direction of stator 140 are in abutment with circumferential end surfaces 190, 191 of another split stator core 175 adjacent to the split stator core 175 in the circumferential direction of stator 140.

Then, yoke portions 176 of split stator cores 175 are arranged in the circumferential direction to define annular yoke body 170.

Figure 3:
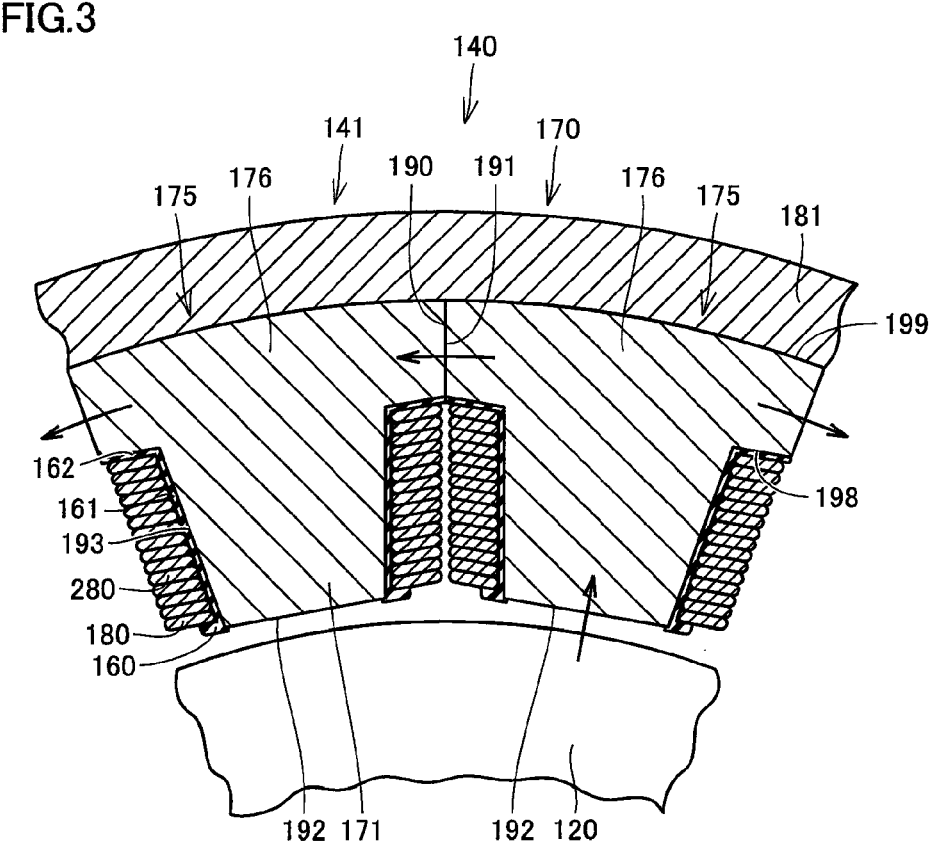
FIG. 3 is an enlarged cross-sectional view showing a partially enlarged view of FIG. 2.

FIG. 3 is an enlarged cross-sectional view showing a partial enlarged view of FIG. 2. As shown in FIG. 3, the cross-section of coil 180 vertical to the direction in which coil 180 extends is formed in a rectangular shape. Specifically, a rectangular wire such as edge width coil is employed. Therefore, the occupancy ratio of coil 180 accommodated in a slot defined between adjacent stator teeth 171 is increased. Coil 180 is successively wound so as to be successively stacked along each of side surfaces 193 arranged in the circumferential direction of stator 140, among the surfaces of stator tooth 171.

Each split stator core 175 is formed by stacking a plurality of unit steel plates 300. The thickness of the unit steel plate is, for example, about 0.3 mm.

Then, insulative insulator 160 is provided between coil 180 and split stator core 175 to ensure insulation between coil 180 and split stator core 175. Insulator 160 is formed, for example, of PPS (Polyphenylene Sulfide) resin or LCP (Liquid Crystal Polymer) resin.

Insulator 160 includes a tubular tooth-receiving portion 161, which can receive stator tooth 171, and an overhang portion 162, which is formed at an end of tooth-receiving portion 161 to extend along the inner circumferential surface of yoke portion 176 and is supported by the inner circumferential surface of yoke portion 176. On an axial end surface located in the direction of rotation center line O in the circumferential surface of tooth-receiving portion 161, a protrusion portion is formed to protrude toward the direction of rotation center line O.

Coil 180 is mounted on the thus formed insulator 160. As shown in FIG. 3, coil 180 is formed by winding a coil wire 280 whose cross section perpendicular to the direction in which it extends is a rectangular shape.

Figure 4:
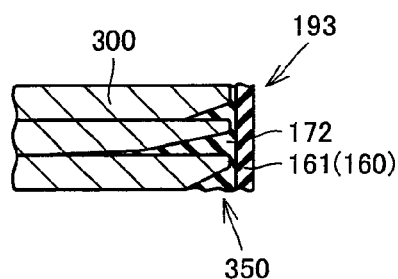
FIG. 4 is a cross-sectional view of a split stator core having a coil and an insulator mounted thereon.
Figure 5:
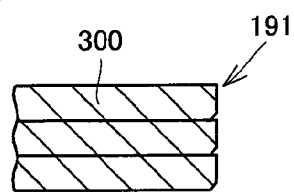
FIG. 5 is a cross-sectional view of the split stator core.

FIG. 4 is a cross-sectional view of split stator core 175 and is a cross-sectional view showing the structure of side surface 193 and the vicinity thereof. FIG. 5 is a cross-sectional view of split stator core 175 and is a cross-sectional view showing circumferential end surface 191 of yoke portion 176 and the vicinity thereof.

As shown in FIG. 4 and FIG. 5, side surface 193 is formed to be rougher than the surface roughness of circumferential end surface 191. In this manner, on side surface 193, a rough surface portion 350 is formed which is rougher than the surface roughness of circumferential end surface 191, so that the surface area of side surface 193 is increased. In this manner, the surface area of split stator core 175 is ensured, so that heat inside split stator core 175 can be dissipated well, thereby improving the heat dissipation efficiency of split stator core 175. Therefore, a temperature increase of split stator core 175 can be prevented, for example, during electric rotating machine 100 being driven, and a temperature increase of coil 180 can be prevented. This prevents degradation of an insulating coat formed on the surface of coil 180, thereby ensuring the insulation performance of coil 180.

Here, in FIG. 2, when electric rotating machine 100 is driven, U-phase coil 180U, V-phase coil 180V, and W-phase coil 180W are supplied with electric power with different phases, and a magnetic flux circuit is formed between rotor 120 and stator 140.

The magnetic flux flowing between rotor 120 and stator 140 passes, for example, from rotor 120 through an air gap to a radial end surface 192 of stator tooth 171 of split stator core 175 and then flows through stator tooth 171 in the radial direction of stator 140. Then, the magnetic flux passes through stator tooth 171 of split stator core 175 and thereafter reaches yoke portion 176. Then, it flows through yoke portion 176 in the circumferential direction of stator 140 and reaches circumferential end surfaces 190, 191 of stator 140. Then, from circumferential end surfaces 190, 191, it enters yoke portion 176 of another split stator core 175 adjacent in the circumferential direction to this split stator core 175, and then returns from stator tooth 171 of another split stator core 175 to stator 140. Specifically, for example, the magnetic flux that enters from stator tooth 171 having U-phase coil 180U mounted thereon returns into rotor 120 from the end surface of stator tooth 171 having another U-phase coil 180U mounted thereon.

In this manner, in stator tooth 171, magnetic flux flows in the radial direction of stator 140. On the other hand, rough surface portion 350 shown in FIG. 4 is formed along side surface 193 of stator tooth 171 and is not formed across the above-noted flux flow, thereby preventing that magnetic reluctance of magnetic flux is increased by rough surface portion 350.

Furthermore, at that part where rough surface portion 350 is located, mold resin 172 is formed to fill in between side surface 193 of stator tooth 171 and tooth-receiving portion 161 of insulator 160. Mold resin 172 extends along the surface of rough surface portion 350 of side surface 193 to fill in between the inner surface of tooth-receiving portion 161 and side surface 193 of stator tooth 171.

Then, mold resin 172 extends from side surface 193 of stator tooth 171 onto axial end surface 177 and axial end surface 178 of stator 140 shown in FIG. 1. Therefore, heat released, for example, from side surface 193 of stator tooth 171 to mold resin 172 reaches mold resin 172 located on axial end surfaces 177, 178 and is then released to the outside.

Then, in FIG. 5 and FIG. 2, the surface roughness of circumferential end surface 190 and circumferential end surface 191 in yoke portion 176 is lower than that of side surface 193. This ensures the contact area between circumferential end surfaces 190 and 191 of adjacent split stator cores 175. Thus, it can be prevented that magnetic reluctance is increased when magnetic flux passes through circumferential end surfaces 190, 191 and passes between yoke portions 176, thereby ensuring a flow of magnetic flux. In this manner, the heat dissipation characteristics of stator 140 can be improved, and in addition, an increase of magnetic reluctance in stator 140 can be prevented.

Here, in FIG. 3, rough surface portion 350 is not limited to each of side surfaces 193 of stator tooth 171 that are arranged in the circumferential direction of stator 140, and may be formed on radial end surface 192 located radially inward of stator 140.

Rough surface portion 350 may be formed on a radial end surface 198 at which stator tooth 171 is formed, of radial end surfaces 198, 199 of yoke portion 176 of split stator core 175 that are arranged in the radial direction of stator 140.

At radial end surface 198, the effect on a magnetic flux flow is small, for example, during electric rotating machine 100 being driven, and it is less likely that forming rough surface portion 350 at this part increases magnetic reluctance.

Figure 6:
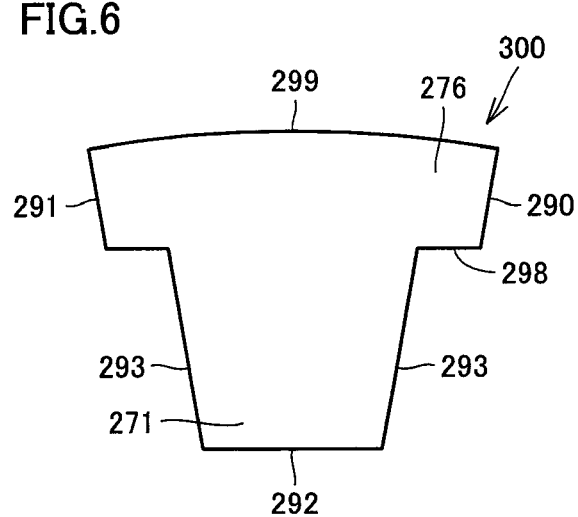
FIG. 6 is a plan view of a unit steel plate.

FIG. 6 is a plan view of unit steel plate 300. As shown in FIG. 6, unit steel plate 300 includes a unit stator tooth 271, which is stacked to define stator tooth 171 of split stator core 175, and a unit yoke portion 276, which is stacked to define yoke portion 176.

Unit steel plates 300 are stacked so that side surfaces 293 of stator 140 of unit stator teeth 271 are stacked to form side surfaces 193 of stator tooth 171 of split stator core 175. Unit circumferential end surfaces 290, 291 of unit yoke portions 276 are successively stacked to form circumferential end surfaces 190, 191 of split stator core 175.

Figure 7:
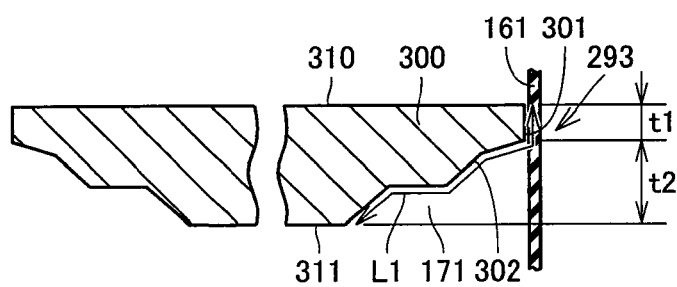
FIG. 7 is a cross-sectional view showing a side surface of the unit steel plate in detail.
Figure 8:
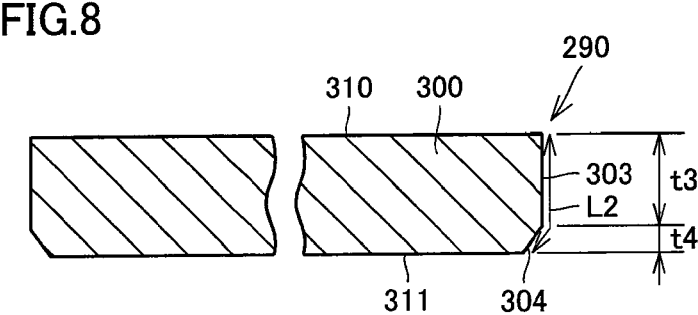
FIG. 8 is a cross-sectional view showing a unit circumferential end surface of the unit steel plate.

FIG. 7 is a cross-sectional view showing side surface 293 of unit steel plate 300 in detail, and FIG. 8 is a cross-sectional view showing unit circumferential end surface 290 of unit steel plate 300 in detail.

In FIG. 7, on the surface of side surface 193, a shear surface 301 and a fracture surface 302 are formed. These shear surface 301 and fracture surface 302 are formed when unit steel plate 300 is stamped with a die. Shear surface 301 extends in the thickness direction of unit steel plate 300 from a main surface 310 toward a main surface 311 of unit steel plate 300 and is formed like an approximately flat surface. Therefore, at that part where shear surface 301 is located, the width of unit steel plate 300 (the width in the circumferential direction of stator 140) is approximately uniform.

Fracture surface 302 is formed to be inclined such that the width of unit steel plate 300 (the width in the circumferential direction of stator 140) is generally reduced from main surface 310 toward main surface 311, and has an irregular surface.

At side surface 293, a region t2 occupied by fracture surface 302 is larger than a region t1 occupied by fracture surface 301.

In FIG. 8, a shear surface 303 and a fracture surface 304 are also formed at unit circumferential end surface 290 of unit steel plate 300. Shear surface 303 is formed like an approximately flat surface and extends in the thickness direction of unit steel plate 300 such that the width of stator 140 is approximately uniform. That part where fracture surface 304 is located is inclined such that the width of unit steel plate 300 is reduced from main surface 310 toward main surface 311.

At that part where unit circumferential end surface 290 is located, a region t3 occupied by shear surface 303 is larger than a region t4 occupied by fracture surface 304.

Then, at side surface 293, the proportion of fracture surface 302 to shear surface 301 is larger than the proportion of fracture surface 304 to shear surface 303 at unit circumferential end surface 290.

Therefore, a surface distance L1 in side surface 293 is longer than a surface distance L2 in unit circumferential end surface 290. Here, surface distance L1 is the length of side surface 293 from main surface 310 to main surface 311, in the cross section of unit steel plate 300. Main surface L2 is the length of unit circumferential end surface 290 from main surface 310 to main surface 311, in the cross section of unit steel plate 300. Then, for example, surface distance L1 is set three times or more than surface distance L2.

Here, since surface distance L1 of side surface 293 is longer as described above, heat inside spilt stator core 175 can be released well from side surface 293 to stator tooth 171, thereby preventing a temperature increase of split stator core 175.

Furthermore, since the proportion of shear surface 303 is larger in unit circumferential end surface 290, the contact area can be ensured between unit circumferential end surface 290 and unit circumferential end surface 290 of another split stator core 175 adjacent to split stator core 175 having the aforementioned unit circumferential end surface 290. Specifically, shear surfaces 303 of adjacent unit steel plates 300 are in contact with each other, so that the contact area is ensured between split stator cores 175 adjacent to each other, thereby reducing magnetic reluctance and ensuring driving performance of electric rotating machine 100. Of a unit radial end surface 299 and a unit radial end surface 298 which are arranged in the radial direction of stator 140, among the surfaces of unit steel plate 300, unit radial end surface 298 at which unit stator tooth 271 is formed may also be formed similar to the above-noted side surface 293. This can improve the heat dissipation efficiency of split stator core 175.

Here, side surface 193, radial end surface 192, and radial end surface 198 are each formed such that the surface roughness is increased from axial end surfaces 177, 178 of stator 140 toward the central portion in the direction of rotation center line O.

Accordingly, the heat dissipation efficiency can be improved at the central portion in the direction of rotation center line O in each split stator core 175, thereby preventing heat accumulation in stator 140.

Figure 9:
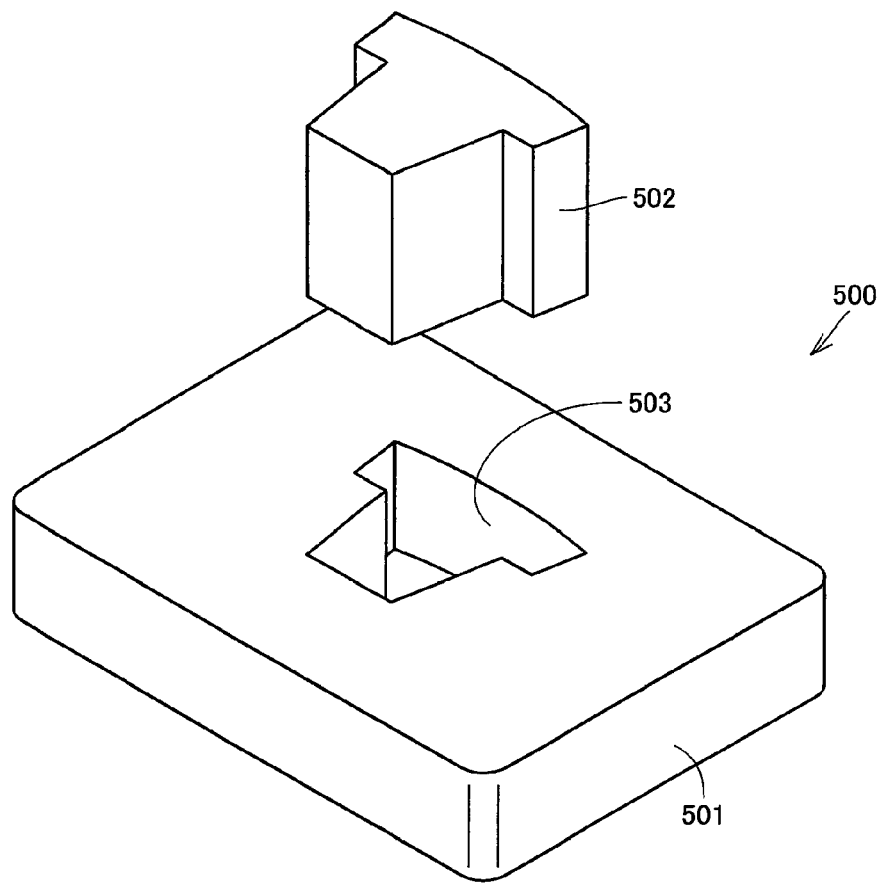
FIG. 9 is a perspective view showing a step of forming a unit steel plate and showing a first step of a process of manufacturing a stator.

A method of manufacturing stator 140 structured as described above will be described using FIG. 9 to FIG. 13. FIG. 9 is a perspective view showing a step of forming unit steel plate 300 and showing a first step of a process of manufacturing stator 140. As shown in FIG. 9, unit steel plate 300 is formed by stamping an electromagnetic steel plate with a die 500.

Die 500 includes a lower die (first die) 501 having a die hole 503 formed in the shape of unit steel plate 300 and an upper die (second die) including a punch (projection portion) 502 which can be inserted into die hole 503.

Then, an electromagnetic steel plate is arranged on lower die 501, and the electromagnetic steel plate is stamped with punch 502 to form unit steel plate 300.

Figure 10:
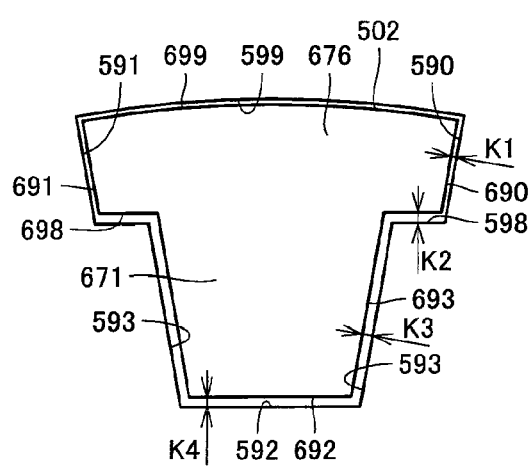
FIG. 10 is a cross-sectional view showing a state when a punch is inserted into a die hole.

FIG. 10 is a cross-sectional view showing a state in which punch 502 is inserted into die hole 503. As shown in FIG. 10, at least part of punch 502 can be inserted into die hole 503, and the outer peripheral portion of punch 502 is formed slightly smaller than the inner peripheral portion of die hole 503.

Here, the inner peripheral portion of die hole 503 extends along the outer peripheral portion of unit steel plate 300. Then, die hole 503 includes an outer periphery forming portion 599 for forming unit radial end surface 299 of unit steel plate 300 shown in FIG. 6, end side forming portions 590, 591 for forming unit circumferential end surfaces 290, 291, an inner periphery forming portion 598 for forming unit radial end surface 298, a side surface forming portion 593 for forming side surface 293, and an end surface forming portion 592 for forming end surface 292.

Punch 502 includes a yoke forming portion 676 for forming unit yoke portion 276 of unit steel plate 300 and a tooth forming portion 671 for forming unit stator tooth 271 of unit steel plate 300.

Then, punch 502 includes an outer periphery forming portion 699 for forming unit radial end surface 299 of unit steel plate 300, an end side forming portion 690 for forming unit circumferential end surface 290, an inner periphery forming portion 698 for forming unit radial end surface 298, a side surface forming portion 693 for forming side surface 293, and an end surface forming portion 692 for forming end surface 292.

When punch 502 is inserted into die hole 503, a clearance K3 between side surface forming portion 693 and side surface forming portion 593 is larger than a clearance K1 between end side forming portion 690 of punch 502 and end side forming portion 591 of die hole 503.

Here, when a cut surface of an electromagnetic steel plate cut by the part with the narrower clearance K1 between the outer peripheral portion of punch 502 and the inner peripheral portion of die hole 503 is compared with a cut surface of an electromagnetic steel cut by the part with the larger clearance K3, a region occupied by the fracture surface is larger than that of the shear surface, in the cut surface formed by the part with the larger clearance K3.

Therefore, when an electromagnetic steel plate is stamped with such die 500 to form unit steel plate 300, the proportion of the fracture surface at the part where side surface 293 is located is larger than the proportion of the fracture surface at the part of unit steel plate 300 where unit circumferential end surface 290 is located.

Accordingly, unit steel plate 300 having surface roughness greater at side surface 293 than at unit circumferential end surface 290 can be formed.

A clearance K4 between end surface forming portion 692 of punch 502 and end surface forming portion 592 of die hole 503 is formed larger than the above-noted clearance K1. Accordingly, unit steel plate 300 formed with die 500 has a surface roughness greater at side surface 292 than at unit circumferential end surface 290.

A clearance K2 between inner periphery forming portion 698 of punch 502 and inner periphery forming portion 598 of die hole 503 is formed larger than the above-noted clearance K1. Thus, in the stamped unit steel plate 300, the surface roughness of unit radial end surface 298 is greater than the surface roughness of unit circumferential end surface 290.

In other words, at the part where the gap between the surface of punch 502 and the inner surface of die hole 503 is large, an electromagnetic steel plate is torn when the electromagnetic steel plate is stamped, thereby facilitating formation of a fracture surface rather than a shear surface.

Figure 11:
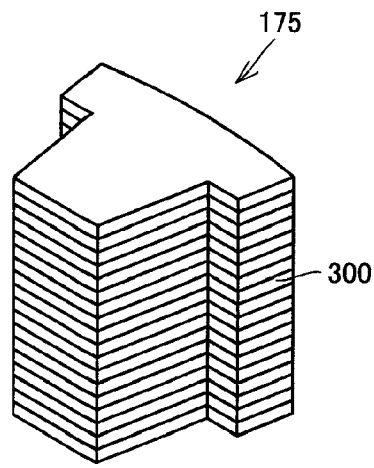
FIG. 11 is a perspective view showing a process of forming a split stator core and showing a second step of the process of manufacturing a stator.

FIG. 11 is a perspective view showing a step of forming split stator core 175 and showing a second step of the process of manufacturing stator 140. As shown in FIG. 11, unit steel plates 300 formed by stamping electromagnetic steel plates with die 500 are stacked to a prescribed height, and the stacked unit steel plates 300 are squeezed to form split stator core 175. Then, insulator 160 is mounted on the formed split stator core 175, and coil 180 is mounted with insulator 160 interposed.

Figure 12:
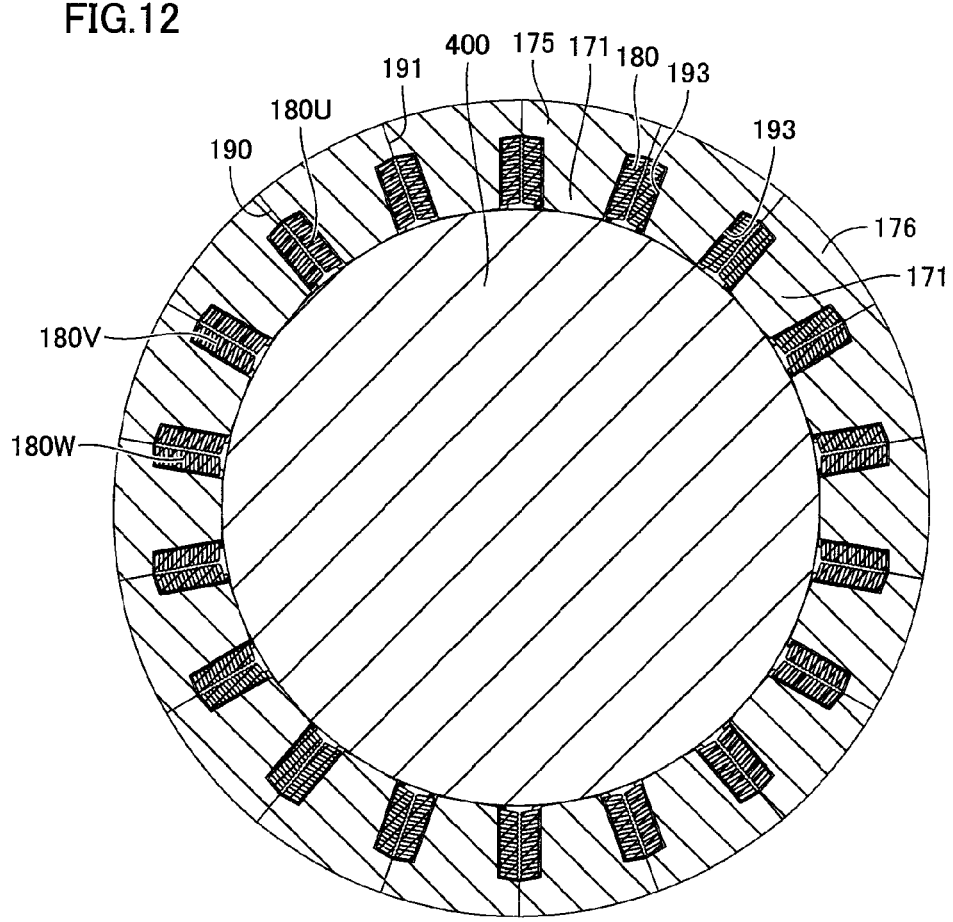
FIG. 12 is a cross-sectional view showing a step of annularly fixing split stator cores and showing a third step of the process of manufacturing a stator.

FIG. 12 is a cross-sectional view showing a step of annularly fixing split stator cores 175 and showing a third step of the process of manufacturing stator 140. In an example shown in FIG. 12, split stator cores 175 are arranged on the outer circumferential surface of a support die 400 having an outer circumferential surface formed in the shape of a circle. Then, split stator cores 175 are arranged annularly with the tip end surfaces of stator teeth 171 of split stator cores 175 being in abutment with the outer circumferential surface of support die 400.

Then, ring 181 is shrinkage-fitted. Thus, the annularly arranged split stator cores 175 are fixed to each other by ring 181.

Figure 13:
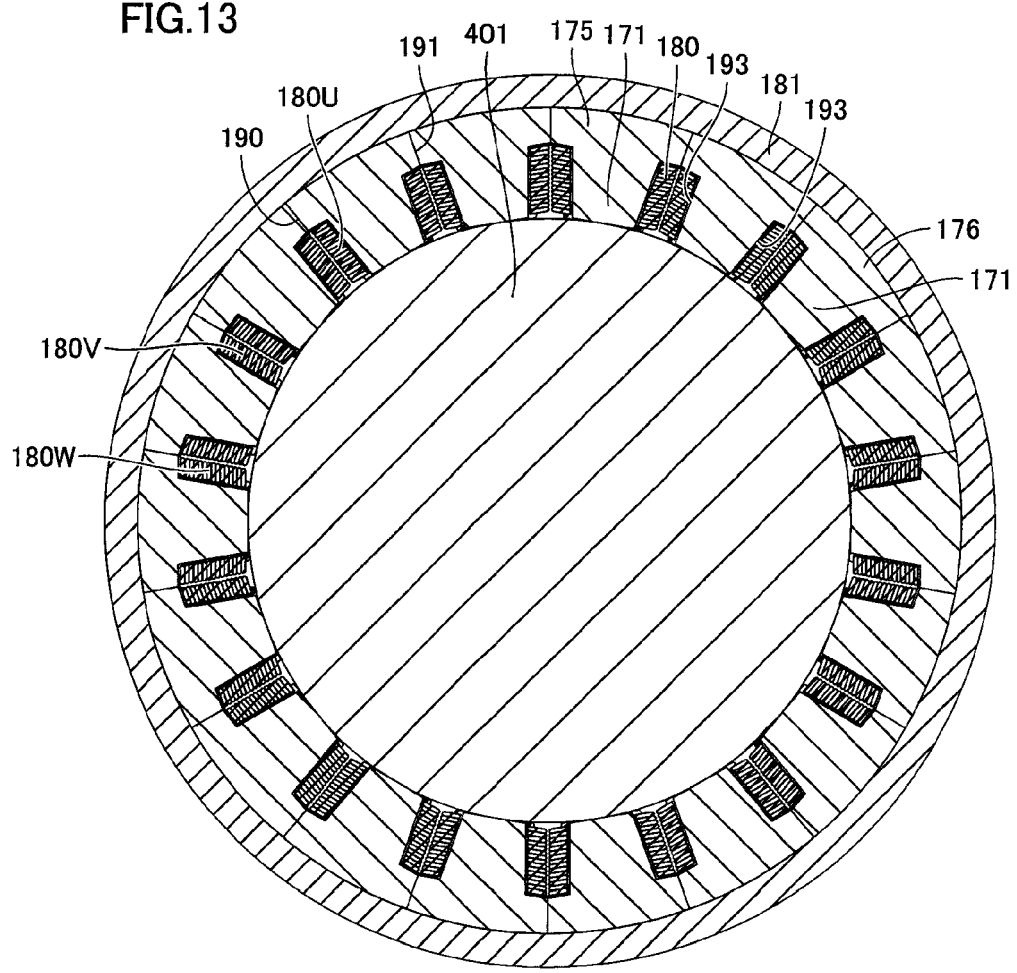
FIG. 13 is a cross-sectional view showing a step of forming mold resin and showing a fourth step of the stator.

FIG. 13 is a cross-sectional view showing a step of forming mold resin 172 and showing a fourth step of stator 140. As shown in FIG. 13, while being mounted on the outer circumferential surface of a plurality of annularly arranged split stator cores 175, ring 181 for annularly fixing split stator cores 175 is inserted into a die to be filled with mold resin, and mold resin is loaded.

Thus, as shown in FIG. 1, mold resin 172 is formed on axial end surfaces 177, 178 of stator 140, and in addition, as shown in FIG. 4, mold resin 172 is also formed to fill in between side surface 193 of split stator core 175 and insulator 160. Furthermore, mold resin 172 is also formed to fill in between radial end surface 198 and overhang portion 162 of insulator 160. In addition, mold resin 172 is also formed on radial end surface 192 since there is a slight gap between an inner die 401 and radial end surface 192 of stator tooth 171. At this time, the mold resin is loaded from the end surface side in the central axis direction of the annularly arranged split stator cores 175.

Therefore, as described above, at circumferential end surface 190, 191, radial end surface 198, and radial end surface 192, the surface roughness on the sides closer to axial end surfaces 177, 178 is made smaller than the surface roughness of the central portion in the direction of rotation center line O, so that the mold resin easily penetrates to the central portion in the direction of rotation center line O.

Here, when mold resin is loaded, coil 180 is mounted on each stator tooth 171. In the first embodiment, coil 180 has a cross section in the shape of a rectangle, and a coil wire forming each coil 180 extends along side surface 193 of stator tooth 171. The loaded mold resin flows along the coil wire.

Therefore, the mold resin can reach the central portion of side surface 193 in the direction of rotation center line O, so that side surface 193 can be covered with mold resin.

Although an edge width coil is employed as coil 180 in the present embodiment, the present invention is not limited thereto.

Second Embodiment

A method of manufacturing an electric rotating machine in accordance with a second embodiment of the invention will be described using FIG. 14 to FIG. 16. It is noted that in the structure shown in FIG. 14 to FIG. 16, the same or corresponding structure as the structure shown in FIG. 1 to FIG. 13 as described above is denoted with the same reference numeral, and a description thereof may be omitted.

Figure 14:
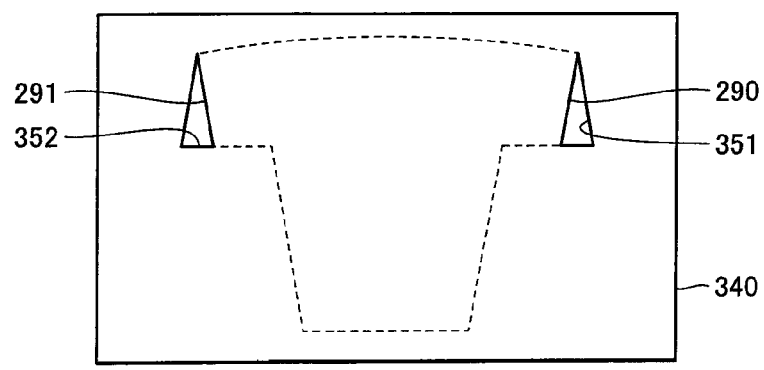
FIG. 14 is a plan view showing a step of forming a cut portion in an electromagnetic steel plate, in the step of forming a unit steel plate by stamping an electromagnetic steel plate, and showing a first step of a process of manufacturing an electric rotating machine.

FIG. 14 is a plan view showing a step of forming cut portions 351, 352 in an electromagnetic steel plate in the process of forming unit steel plate 300 by stamping an electromagnetic steel plate, and showing a first step of the process of manufacturing electric rotating machine 100. As shown in FIG. 14, cut portion 351 and cut portion 352 are formed at a distance from each other.

Here, cut portion 351 and cut portion 352 are each formed, for example, in the shape of a triangle, in which one side portion of cut portion 351 forms unit circumferential end surface 290 of unit steel plate 300, and one side portion of cut portion 352 forms unit circumferential end surface 291.

Figure 15:
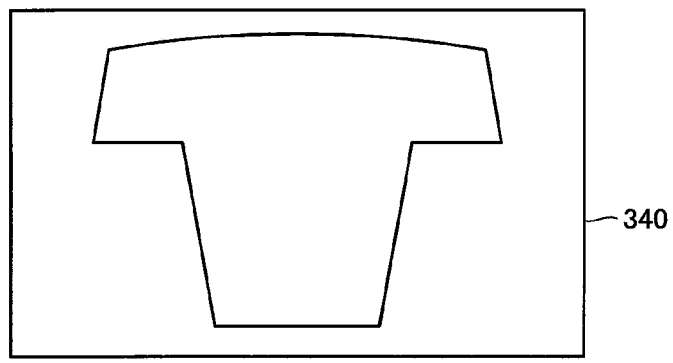
FIG. 15 is a plan view showing the step of forming a unit steel plate by stamping an electromagnetic steel plate and showing a step following the step shown in FIG. 14.

FIG. 15 is a plan view showing a step of forming unit steel plate 300 by stamping an electromagnetic steel plate and showing a step following the above-noted step shown in FIG. 14. FIG. 16 is a plan view of unit steel plate 300 stamped out by the step shown in FIG. 15.

Figure 16:
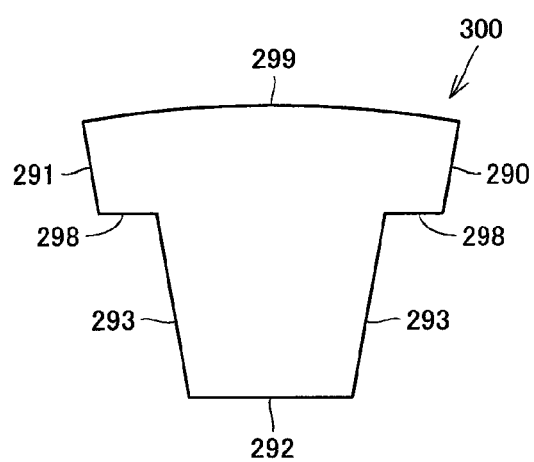
FIG. 16 is a plan view of a unit steel plate stamped out by the step shown in FIG. 15.

As shown in FIG. 15, unit steel plate 300 shown in FIG. 16 is formed by stamping an electromagnetic steel plate in which unit circumferential end surface 290 and unit circumferential end surface 291 are formed.

As shown in FIG. 15, in the electromagnetic steel plate in which cut portions 351, 352 are formed in advance, those parts of unit steel plate 300 which serve as unit radial end surface 299, unit radial end surface 298, side surface 293, and side surface 292 are stamped out. Thus, unit steel plate 300 can be formed. In this manner, in the first stamping step shown in FIG. 14, the part serving as unit circumferential side surface 290 is stamped out, and the other parts of unit steel plate 300 are thereafter formed.

Here, the parts serving as unit circumferential end surfaces 290, 291 are smaller than the amount stamped out in the second stamping step. Therefore, the cut surfaces of unit circumferential end surfaces 290, 291 formed in the first stamping step are mostly shear surfaces 303, as shown in FIG. 8.

On the other hand, the part formed in the second stamping step is larger than the amount stamped out in the first stamping step, and therefore, the cut surface of the part formed in the second stamping step has a larger fracture surface, as shown in FIG. 7.

Thus, the surface roughness of unit circumferential end surface 290 can be made smaller than that of side surface 293, unit radial end surface 298, and end surface 292.

Then, the thus formed unit steel plates 300 are stacked to form split stator core 175, and stator 140 is produced. In stator 140 produced in this manner, similar to stator 140 in accordance with the forgoing first embodiment, the heat dissipation efficiency can be improved and reluctance of the magnetic circuit can be reduced.

Third Embodiment

A method of manufacturing stator 140 in accordance with a third embodiment of the invention will be described using FIG. 17. It is noted that in FIG. 17 the same structure as the structure shown in FIG. 1 to FIG. 16 as described above is denoted with the same reference numeral, and a description thereof may be omitted.

Figure 17:
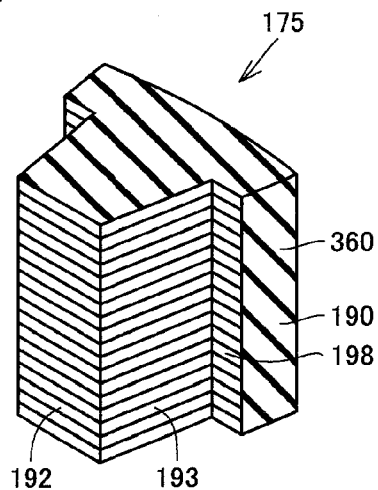
FIG. 17 is a perspective view showing a step following the formation of the split stator core.

FIG. 17 is a perspective view showing a step following the formation of split stator core 175. In FIG. 17, a plurality of unit steel plates 300 are stacked to form split stator core 175. Then, a protective film 360 is formed to cover, of the surfaces of split stator core 175, the opposite end surfaces of split stator core 175 that are located in the stacking direction of unit steel plates 300, circumferential end surfaces 190, 191, and radial end surface 199.

Therefore, side surface 193 and radial end surface 192 of stator tooth 171 and radial end surface 198 of yoke portion 176 are exposed to the outside. With side surface 193 and radial end surface 192 being exposed in this manner, shot peening is performed on the surfaces to increase the surface roughness of side surface 193 and radial end surface 192. It is noted that the present invention is not limited to such shot peening, and, for example, surface treatment using chemicals may be performed by applying, for example, acid to the surfaces of side surface 193 and radial end surface 192.

In this manner, surface treatment is performed on side surface 193 and radial end surface 192, and split stator cores 175 are annularly arranged to form stator 140. Thus, stator 140 with side surface 193 and radial end surface 192 having a large surface area can be formed, and stator 140 with improved heat dissipation efficiency can be formed.

Fourth Embodiment

A method of manufacturing stator 140 in accordance with a fourth embodiment of the invention will be described using FIG. 18. It is noted that in FIG. 18, the same or corresponding structure as the structure shown in FIG. 1 to FIG. 17 as described above will be denoted with the same reference numeral, and a description thereof will be omitted.

Figure 18:
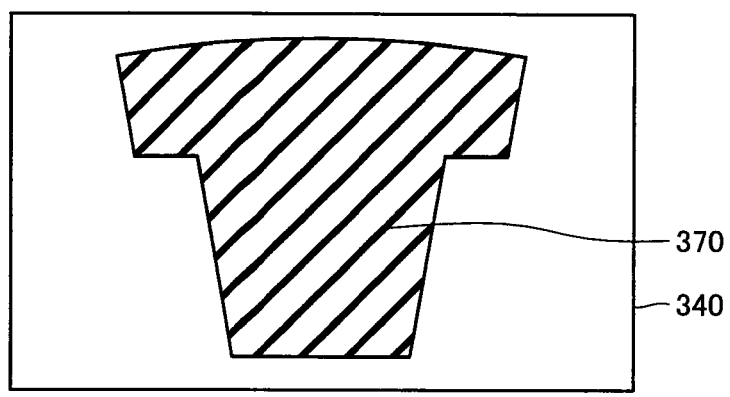
FIG. 18 is a plan view showing a step of manufacturing a unit steel plate in the process of manufacturing a stator in accordance with a fourth embodiment of the present invention.

FIG. 18 is a plan view showing a step of producing unit steel plate 300 in the process of manufacturing stator 140 in accordance with the fourth embodiment of the invention. As shown in FIG. 18, a mask 370 formed in the shape of unit steel plate 300 is formed on a surface of an electromagnetic steel plate 340.

Then, etching is performed on electromagnetic steel plate 340 having mask 370 formed thereon to form unit steel plate 300.

The thus formed unit steel plates 300 are stacked to form split stator core 175, and circumferential end surface 190, 191 are thereafter polished. Thus, the surface roughness of side surface 193 and radial end surface 192 is reduced as compared with the surface roughness of circumferential end surface 190 and circumferential end surface 191. In this manner, split stator cores 175 subjected to polishing are annularly arranged, and split stator cores 175 are thereafter fixed using ring 181 to form stator 140. In the example shown in FIG. 18, unit steel plate 300 is formed by etching. However, the present invention is not limited thereto, and unit steel plate 300 may be cut out from electromagnetic steel plate 340 using a wire cut machine. Then, unit steel plates 300 wire-cut from unit steel plate 300 are stacked to form split stator core 175. Then, polishing may be performed similarly on the surfaces of circumferential end surfaces 190, 191.

In stator 140 formed in this manner, similar to stator 140 shown in the foregoing first to third embodiments, the surface area of stator tooth 171 can be increased, so that the heat dissipation efficiency of stator 140 can be improved, and in addition, magnetic reluctance can be reduced.

Although the embodiments of the present invention have been described above, the embodiments disclosed here should be understood as being illustrative rather than being limitative in all respects. The scope of the present invention is shown by the claims, and it is intended that all modifications that come within the meaning and range of equivalence to the claims are embraced here. Furthermore, the foregoing numeric values are illustrative and the present invention is not limited to the foregoing numeric values and range.

INDUSTRIAL APPLICABILITY

The present invention is suitable for a method of manufacturing a stator.

DESCRIPTION OF THE REFERENCE SIGNS 100 electric rotating machine, 110 rotating shaft, 120 rotor, 122 end plate, 123 permanent magnet, 124 resin, 125 rotor core, 126 magnet insertion hole, 131 axial end surface, 132 axial end surface, 135 radial end surface, 140 stator, 141 stator core, 145 radial end surface, 150 lead portion, 151 winding portion, 152 end portion, 153 lead portion, 154 connecting wire, 155 end portion, 160 insulator, 161 tooth-receiving portion, 162 overhang portion, 163, 164 protrusion portion, 170 yoke body, 171 stator tooth, 172 mold resin, 175 split stator core, 176 yoke portion, 177, 178 axial end surface, 180 coil, 181 ring, 190, 191 circumferential end surface, 192 radial end surface, 193 side surface, 198 radial end surface, 271 unit stator tooth, 276 unit yoke portion, 280 coil wire, 301 shear surface, 302 fracture surface, 303 shear surface, 304 fracture surface, 310 main surface, 311 main surface, 340 electromagnetic steel plate, 350 rough surface portion.

The invention claimed is:

1. A method of manufacturing a stator including a stator core formed by annularly arranging a plurality of split stator cores each formed by stacking a plurality of unit steel plates, each of the plurality of unit steel plates including a unit yoke portion and a unit stator tooth portion formed to protrude from the unit yoke portion, said split stator cores each including a yoke portion formed by stacking the unit yoke portions of said plurality of unit steel plates and a stator tooth formed by stacking the unit stator tooth portions of said plurality of unit steel plates, comprising the step of:

arranging an electromagnetic steel plate between a first die having a hole portion formed in a shape of one of the plurality of unit steel plates and a second die including a projection portion formed in a shape of the one of the plurality of unit steel plates, which can be inserted into said hole portion, forming the one of the plurality of unit steel plates by said first die and said second die, wherein, in a gap between an inner surface of said first die that defines said hole portion and an outer surface of said projection portion, a gap at a part that forms said unit stator tooth portion is larger than a gap at a part that defines a unit circumferential end surface of said unit yoke portion that is located in a circumferential direction of said stator core.

2. The method of manufacturing a stator according to claim 1, wherein:

said unit stator tooth portion includes a unit side surface forming a side surface of said stator tooth;

said unit yoke portion includes said unit circumferential end surface forming a circumferential end surface of said yoke portion;

said projection portion includes a side surface forming portion for forming said unit side surface of said unit stator tooth portion, and an end side forming portion for forming said unit circumferential end surface of said unit yoke portion;

said hole portion has an inner peripheral portion including a side surface forming portion for forming said unit side surface of said unit stator tooth portion, and an end side forming portion for forming said unit circumferential end surface of said unit yoke portion; and when said projection portion is inserted into said hole portion, a clearance between said side surface forming portion of said projection portion and said side surface forming portion of said hole portion is larger than a clearance between said end side forming portion of said projection portion and said end side forming portion of said hole portion.

3. The method of manufacturing a stator according to claim 1, wherein:

one of the plurality of unit steel plates has a surface including a first unit radial end surface and a second unit radial end surface arranged in a radial direction of said stator;

said first unit radial end surface is provided with said unit stator tooth portion;

said unit yoke portion includes said unit circumferential end surface forming a circumferential end surface of said yoke portion;

said projection portion includes an inner periphery forming portion for forming said first unit radial end surface, and an end side forming portion for forming said unit circumferential end surface;

said hole portion has an inner peripheral portion including an inner periphery forming portion for forming said first unit radial end surface, and an end side forming portion for forming said unit circumferential end surface; and when said projection portion is inserted into said hole portion, a clearance between said inner periphery forming portion of said projection portion and said inner periphery forming portion of said hole portion is larger than a clearance between said end side forming portion of said projection portion and said end side forming portion of said hole portion.

4. The method of manufacturing a stator according to claim 1, wherein:

said unit stator tooth portion includes a unit end surface forming an end surface of said stator tooth;

said unit yoke portion includes said unit circumferential end surface forming a circumferential end surface of said yoke portion;

said projection portion includes an end surface forming portion for forming said unit end surface, and an end side forming portion for forming said unit circumferential end surface;

said hole portion has an inner peripheral portion including an end surface forming portion for forming said unit end surface, and an end side forming portion for forming said unit circumferential end surface; and a clearance between said end surface forming portion of said projection portion and said end surface forming portion of said hole portion is larger than a clearance between said end side forming portion of said projection portion and said end side forming portion of said hole portion.

* * * * *

UNITED STATES PATENT AND TRADEMARK OFFICE
CERTIFICATE OF CORRECTION

PATENT NO.        : 8,590,137 B2
APPLICATION NO.   : 13/133548
DATED             : November 26, 2013
INVENTOR(S)       : Urano et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 183 days.

Signed and Sealed this
Twenty-second Day of September, 2015

Michelle K. Lee
*Director of the United States Patent and Trademark Office*